Patented Dec. 11, 1951

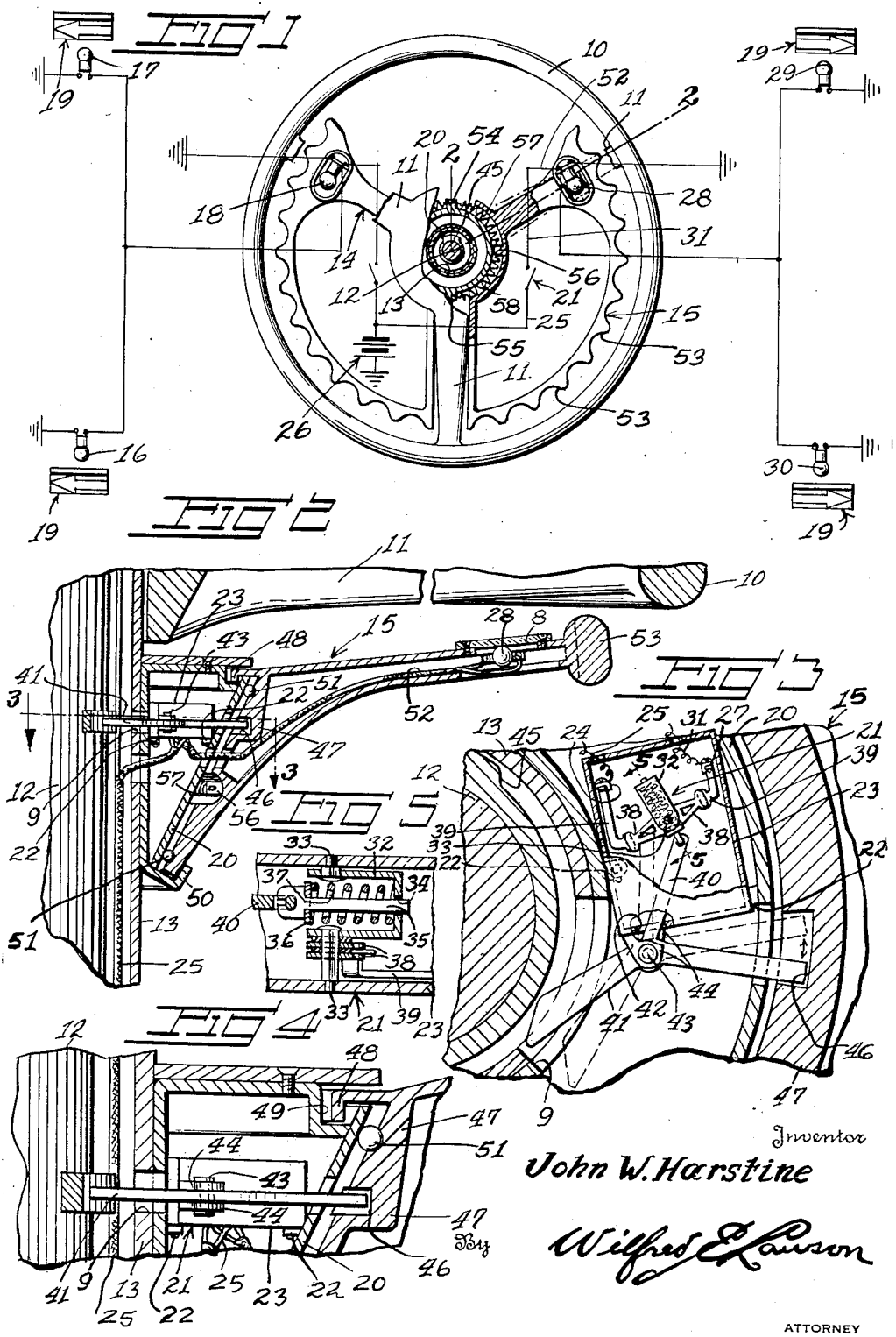

2,578,423

UNITED STATES PATENT OFFICE 2,578,423

DIRECTIONAL SIGNAL SWITCH ASSEMBLY FOR VEHICLES

John W. Harstine, Dover, Ohio

Application December 7, 1948, Serial No. 63,907

3 Claims. (Cl. 200—59)

This invention relates to a directional signal assembly for a vehicle.

The object of the invention is to provide a manually-operable directional signal assembly for a vehicle which will enable the operator of the vehicle to signal an intended turn to other vehicle operators.

Another object of the invention is to provide a manually-operable directional signal assembly for a vehicle which is convenient to operate, sturdy in construction, and attractively constructed.

A further object of the invention is o provide a directional signal assembly for a vehicle which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a top plan view, with parts broken away, illustrating the position of the directional signal assembly relative to the steering wheel, and showing diagrammatically the electrical wiring of the device;

Figure 2 is an enlarged sectional view taken on the line 2—2 of Figure 1;

Figure 3 is an enlarged sectional view taken on the line 3—3 of Figure 2;

Figure 4 is a fragmentary view on an enlarged scale similar to Figure 2 and illustrating certain constructural details of the assembly;

Figure 5 is an enlarged sectional view taken on the line 5—5 of Figure 3.

Referring in detail to the drawings, the numeral 10 designates a conventional vehicle steering wheel which includes radially-disposed arms 11 that are operatively connected to a steering column 12. Arranged in spaced, concentric relation with respect to the column 12 is a conventional steering housing 13.

Arranged immediately below the steering wheel 10 is a pair of directional signal assemblies 14 and 15, Figure 1. The signal assembly 14 is actuated by the operator of the vehicle in order to warn other vehicle drivers of an intended left turn. This is accomplished by actuating simultaneously a signal light 16 arranged on the rear of the vehicle, and a signal light 17 arranged on the front of the vehicle. A pilot light 18 is also provided for reminding the vehicle operator that the lights 16 and 17 are "on." Each of the lights 16 and 17 is provided with a suitable protecting lens 19 having a directional arrow marked thereon.

The other signal assembly 15 is for signalling or indicating a turn to the right, and as each of the signal assemblies 14 and 15 has the same construction, only the construction of the signal assembly 15 will be described in detail.

The directional signal assembly 15 comprises a cone-shaped casing 20 which is secured, as by welding, to the steering housing 13. Arranged in the casing 20 is a toggle switch 21 which is supported by and secured to a pair of lugs 22 which extend from opposite sides of the casing 20. The toggle switch 21, Figures 3 and 5, includes a box 23 and connected to the box 23 is a first metal contact 24 which is electrically connected by a cable 25 to a source of electrical energy, such as a battery 26. A second contact 27 is electrically connected by a cable 31 to a pilot light 28 and also to a pair of signal lights 29 and 30, arranged on the front and rear of the vehicle. Arranged in the box 23 is an open-ended support member 32 which is pivotally connected to the top and bottom of the box 32 by pins 33. The support member 32 has an aperture 34 arranged therein and slidably projecting through the aperture 34 is a rod 35 carrying a washer 36 thereon. A coil spring 37 is arranged on the rod 35 for normally urging the rod toward the open end of the support member. A female contact member 38 is secured to the support member and its opposite ends are adapted to be moved into engagement with the male contact members 39 upon pivotal movement of the support member 32. Since the male contact members 39 are electrically connected to the contacts 24 and 27, the circuit to the lights will be selectively actuated upon pivotal movement of the support member 32.

For causing pivotal movement of the support member 32, a finger 40 has one end pivotally connected to the rod 35, and its other end projecting through an opening 42 in the box 23 and is secured to a lever 41 intermediate the ends of the latter. The lever 41 is pivotally connected to the box 23 by a pin 43 which is rotatably supported by a lug 44 that is secured to the box 23.

A cam member 45 is secured to the steering column 12 for engaging or abutting one end of the lever 41 which projects through registering openings 9 in the casing and housing to thereby pivot the lever. The other end of the lever 41 is positioned in a slot 46 in an arm 47 for a purpose to be subsequently described.

The arm 47 is rotatably connected to the casing 20 by means of a lip 48 which rides in a groove 49 formed in the top of the casing. The lower end of the arm 47 is slidably supported by a flange 50 which projects from the casing 20, there being suitable ball bearings 51 interposed between the confronting faces of the casing and arm. The arm 47 is preferably fabricated of aluminum and is hollow. Extending through the arm 47 is a conductor cable 52 which leads to the pilot light 28, there being a lens 8 supported on the arm for covering and protecting the pilot bulb. The arm is provided with a plurality of finger engaging grooves 53 for facilitating turning of the arm by the operator. Projecting from the exterior of the housing 13 and secured thereto is a pair of diametrically-opposed lugs 54 and 55, Figure 1. An ear 56 is secured to the arm 47 and a coil spring 57 has one end secured to the ear 56 and its other end secured to the lug 54. A second coil spring 58 has one end secured to the ear 56 and its other end secured to the lug 55, and these coil springs are for returning the arm 47 to its normal or vertical position after release of manual pressure thereon.

In use, assuming the vehicle operator wishes to signal to other drivers that he is going to make a right turn. Then the arm 47 is moved clockwise to thereby pivot the lever 41 from the dotted line position of Figure 3 to the illustrated solid line position. This causes the toggle switch to electrically energize the bulbs 29 and 30 and also the pilot light 28. The arm 47 can then be released and it will be returned to its normal or neutral position by means of the springs 57 and 58. This returning movement of the arm 47 will not affect the toggle switch 21 since the slot 46 is large enough to permit movement of the arm 47 without moving the lever 41. Then, as the steering column 12 is rotated in a clockwise direction to turn the vehicle, the cam member 45 will engage the lever 41 to trip the toggle switch 21 to thereby break or open the circuit leading to the various bulbs. The manually-operable directional signal assembly 14 functions similarly and is used for signalling an intended turn to the left.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In an electrical system for motor vehicles, including the steering post of the vehicle and the casing enclosing the post, a housing fixedly mounted on each of the right and left hand sides of said casing and having horizontally disposed slots in its side walls aligned with each other and with a like slot in said casing, a hollow arm mounted for limited turning movements on said housing, a normally open circuit controlling switch mounted within said housing and in electrical connection with the electrical energy source of the vehicle, a pilot lamp mounted in the outer end of said arm and in electrical connection with said switch and a circuit, means for closing said switch on said energy source, said pilot lamp and said circuit, when said arm is turned in one direction, said switch remaining closed when said arm is returned to its initial position, a cam element mounted on said steering post in line with the said slots, and a member extending from said switch through the said slots into the path of movement of said cam to affect the opening of said switch, when the steering post is turned to change the direction of travel of the vehicle.

2. The invention as defined in claim 1, with an arcuate portion extending laterally from the outer end of said arm in parallel relation with respect to the inner side of the rim of the steering wheel on said post and having a slot in its inner side, and a second member extending from said switch and engaged with the last named slot, said second member being actuated to close said switch when the arm is turned in the said one direction.

3. The invention as defined in claim 1, with the said switch being of a toggle construction and the said member extending therefrom in the form of an arm, a second arm extending from said switch in a direction opposite from that of the first arm, an arcuate portion extending laterally from the outer end of said hollow arm and having a slot in its inner side engaged by the outer end of said second arm, said second arm being actuated to close said switch, when the hollow arm is turned in the said one direction.

JOHN W. HARSTINE.

REFERENCES CITED

The following references are of record in the file of this patent:

UNITED STATES PATENTS

| Number | Name | Date |
| --- | --- | --- |
| 1,134,909 | Rosselot | Aug. 6, 1915 |
| 1,465,596 | Collins et al. | Aug. 21, 1923 |
| 1,690,370 | Hoeller | Nov. 6, 1928 |
| 1,710,708 | Murray | Apr. 30, 1929 |
| 1,753,078 | Yocum | Apr. 1, 1930 |
| 2,120,288 | McCready | June 14, 1938 |
| 2,215,229 | Pybus | Sept. 17, 1940 |
| 2,476,487 | Frank | July 19, 1949 |